United States Patent [19]
Hoshino et al.

[11] Patent Number: 5,955,169
[45] Date of Patent: *Sep. 21, 1999

[54] FLOPPY DISK

[75] Inventors: Masakazu Hoshino; Eizou Sakurai, both of Nagoya; Hajime Itoh, Otake; Kunio Iwase; Toshio Nagasaka, both of Nagoya, all of Japan

[73] Assignee: Mitsubishi Rayon Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,889

[22] Filed: Sep. 25, 1996

[30] Foreign Application Priority Data

| Sep. 26, 1995 | [JP] | Japan | 7-248083 |
| Sep. 26, 1995 | [JP] | Japan | 7-248084 |
| Sep. 26, 1995 | [JP] | Japan | 7-248085 |
| Sep. 26, 1995 | [JP] | Japan | 7-248086 |
| Sep. 26, 1995 | [JP] | Japan | 7-248087 |
| Sep. 26, 1995 | [JP] | Japan | 7-248088 |
| Sep. 26, 1995 | [JP] | Japan | 7-248089 |

[51] Int. Cl.$^6$ ............ G11B 5/702; G11B 23/03
[52] U.S. Cl. ........... 428/65.3; 428/65.9; 428/694 BU; 428/694 BL; 360/133
[58] Field of Search ........... 428/694 R, 694 BU, 428/694 BL, 65.3, 65.9; 360/133

[56] References Cited

U.S. PATENT DOCUMENTS 5,116,685  5/1992  Karle et al. ............... 428/694 BU
5,578,376  11/1996  Hashimoto et al. ........... 428/694 BL

FOREIGN PATENT DOCUMENTS 7-320443  12/1995  Japan .

OTHER PUBLICATIONS

English translation of JP 7–320443, Dec. 1995.

*Primary Examiner*—Christopher D. Rodee
*Attorney, Agent, or Firm*—Oblon, Spivak, McClelland, Maier & Neustadt, P.C.

[57] ABSTRACT

A floppy disk in which the binder for fixing a magnetic substance in the recording layer of the magnetic disk is a polyester polyurethane and the liner of the jacket contains an acrylic fiber and in addition a fiber treating agent having a surface tension in a specific range. The floppy disk is excellent in workability, can be prepared in high yields because the number of dusts generated upon its preparation is small, and also is excellent in the permanence of recording performance.

5 Claims, No Drawings

FLOPPY DISK

BACKGROUND OF THE INVENTION

1. Field of the Invention

The present invention relates to a floppy disk in wide use as a recording medium for office automation appliances and the like.

2. Prior art

Floppy disks generally assume a boxy shape composed of a polymer resin, such as vinyl chloride resins and ABS resins, and a liner made up of a nonwoven sheet is joined onto the inner surface of a jacket of the boxy shape. The liner made up of the nonwoven fabric aims principally at cutting off the direct contact of a magnetic disk with the resin constituting the jacket itself to clean the surface of the magnetic disk. The liner is also demanded to have important characteristics of not generating dusts from itself.

Accordingly, a variety of nonwoven sheets has been proposed to date as the liner. For example, Japanese Patent Laid-Open No. 7705/1983 discloses a nonwoven liner made from a polyester fiber; Japanese Utility Model Laid-Open No. 71280/1982 teaches a nonwoven liner made of a regenerated fiber; and Japanese Utility Model Publication No. 14371/1993 describes a nonwoven liner prepared from an acrylic fiber. In all of these liners, fibers are welded to each other or bonded together with an adhesive to stabilize the form of the nonwoven fabrics.

When a polyester fiber is used as the raw fiber of a nonwoven fabric for use in the liner of a floppy disk jacket, its high fiber strength gives rise to a problem of workability, including poor punchability, upon forming the liner. Separately, when a cellulosic fiber such as a regenerated fiber is used, the workability is excellent, but it is essential to use a heat-welding fiber having a low-melting point or an adhesive upon processing. These materials adhere to the magnetic disk, causing recording errors at times.

On the other hand, acrylic fibers are extremely favored because they are free from these problems. They however raise a large influential problem of generating dusts in the preparation of floppy disks, and it is an important task to solve this problem. In the preparation of a floppy disk, dusts are generated most in the welding process of the jacket where ultrasonic welding is employed. The dust generation is due to the vibration caused by the ultrasonic welding. The dusts fall down onto the magnetic disk. Most dusts drop particularly from liner edges such as the window part. Since the dusts give fatal influences on the recording performance of the magnetic disk, they are removed from the window part even after the ultrasonic welding by arranging dust removal units at every steps in the preparation process of the floppy disk. However, the amount of dusts before the dust removal treatments influences the reliability of the recording performance of the magnetic disk and controls the yield in the preparation of the floppy disk.

As a results of investigations by the present inventors, it is found that the size of dusts that causes recording error is approximately from several $\mu$m to several tens of $\mu$m, and as the dusts in this range becomes fewer, the yield of the floppy disk tends to be better. Further, it has been clarified that where the numbers of dusts are identical, dusts generated from acrylic fibers give more serious influence on recording error than dusts from other fibers, such as cellulosic fibers and polyester fibers.

The reason why the dusts from acrylic fibers give greater influence on recording error than the dusts from other fibers is that the dusts from acrylic fibers cannot be removed completely by the dust removal (for example, techniques disclosed in Japanese Patent Laid-Open Nos. 270087/1987 and 161525/1987) in the preparation process of floppy disks, owing to the nature of the dusts being readily electrified, characteristics of acrylic fibers, as well as to the size of the dusts of acrylic fibers.

Japanese Patent Laid-Open No. 110513/1978 discloses a liner formed by applying an anionic, cationic or nonionic antistatic agent to a nonwoven fabric made of a rayon fiber; Japanese Patent Laid-Open No. 49115/1979 describes a liner formed by applying both a lubricant and an antistatic agent to a nonwoven fabric made from polypropylene filaments; and Japanese Patent Laid-Open No. 142768/1991 teaches a liner with linear polydimethylsiloxane and a cationic or anionic antistatic agent applied.

In the techniques disclosed in the foregoing patent publications, it has been found that the floppy disks exhibit excellent dust removal properties immediately or shortly after the assembly of the disks, but after the floppy disks have been left alone for a long period of time, the agents applied errode the magnetic disks, causing the magnetic layers to swell and the magnetic powders to fall off.

SUMMARY OF THE INVENTION

The object of the present invention is to provide a floppy disk comprising a specific magnetic disk combined with a floppy disk jacket having a liner by means of which dusts fallen down onto the magnetic disk can be removed with ease without strongly adhering to the magnetic disk.

The first gist of the present invention is a floppy disk comprising a jacket and a magnetic disk incorporated therein, the binder for fixing a magnetic substance in the recording layer of the magnetic disk being a polyester polyurethane, the polyester portion thereof being composed of at least one of a trifunctional acid component and a trifunctional alcohol component, and the liner of the jacket containing an acrylic fiber, wherein the liner of the jacket contains 0.1–5% by weight of a fiber treating agent having a surface tension of 35–57 dyne/cm. The second gist is a floppy disk comprising a jacket and a magnetic disk incorporated therein, the binder for fixing a magnetic substance in the recording layer of the magnetic disk being a polyester polyurethane, the polyester portion being composed of a bifunctional acid component and a bifunctional alcohol component, and the liner of the jacket containing an acrylic fiber, wherein the liner of the jacket contains 0.1–5% by weight of a fiber treating agent having a surface tension of 35–47 dyne/cm.

DETAILED DESCRIPTION OF THE PREFERRED EMBODIMENTS

In the present invention, the agent applied to the liner of the jacket is simply referred to as a fiber treating agent, which includes antistatic agents, emulsifying agents, surface active agents, softening agents and smoothing agents, that are all used in the post-treatment of fibers. In the present invention, it is necessary to select a fiber treating agent that meets the below-mentioned conditions in accordance with the constitution of the polyester polyurethane, the binder for fixing a magnetic substance in the recording layer of the magnetic disk used.

The proper range of each usable fiber treating agent varies in accordance with the kind of the binder for fixing a magnetic substance in the recording layer of the magnetic disk because of the following reason.

The recording layer of the magnetic disk is generally formed by fixing a composition including a magnetic substance with a binder made of a polyester polyurethane on a substrate of a polyester sheet. However, the composition of the recording layer varies depending on such purposes that the layer be hard and highly durable or soft and flexible, and variation particularly appears in the composition of the polyester segment.

Magnetic disks commercially available at present are broadly divided into those in which at least one of a trifunctional or upward acid component and a trifunctional or upward alcohol component is used in the polyester segment of the polyester polyurethane binder (hereinafter referred to as crosslinked magnetic disks) and those in which a bifunctional acid component and a bifunctional alcohol component are used (hereinafter referred to as non-crosslinked magnetic disks).

Taking the constitution of the crosslinked magnetic disk, the disk lacks flexibility to some extent, but the structure of its recording layer is minute and therefore fiber treating agents hardly penetrate through the layer, so that the range of usable fiber treating agents is broadened.

Separately, taking the constitution of the non-crosslinked magnetic disk, the disk is rich in flexibility and excellent in workability, but it is somewhat inferior to the former in the minuteness of the structure of the recording layer. Therefore the proper range is restricted.

In consideration of the proper range of the fiber treating agent, it is not possible, as a matter of course, to ignore the polyurethane component of the polyester polyurethane binder. Any fiber treating agent, that penetrates into the polyurethane component and causes it swell, cannot be used even if it does not affect adversely the aforementioned polyester component.

The present inventors have studied intensively combinations of a variety of fiber treating agents and magnetic disks, and found that surface tension, penetration coefficient, solubility parameter and HLB value are controlling factors for selecting a proper fiber treating agent. The present inventions have been completed on the basis of this discovery.

Next, each of the inventions will be illustrated.

For the floppy disk of the first invention, it is essential to contain an acrylic fiber as its constituent fiber, in order that the liner of the jacket does not weld upon thermocompression bonding and the shape of the liner is maintained by plastic deformation and, in addition, the flexibility of the liner is not impaired and the liner does not remain uncut upon punching.

No particular limitation is imposed on the properties of the acrylic fiber nor on the raw polymer of the acrylic fiber. Any acrylic polymers commonly available may be used.

The liner may contain other fibers in combination with an anacryic fiber. When the liner contains an acrylic fiber in an amount of 50–90% by weight together with other fibers, it is possible to prevent the thermocompression bonding part thereof from becoming filmy and to stop dust evolution due to the filminess. In addition, it is also possible to suppress the elongation deformation of cloth that occurs occasionally when an acrylic fiber is used alone. Further, it also falls under the scope of the present invention to use other fibers than acrylic fibers in the layer where the liner is brought into contact with a magnetic disk. In any case, as the fibers other than acrylic fibers, it is possible to use those having conventionally been used as liners of jackets of floppy disks, such as cellulosic fibers and polyester fibers.

The first invention solves the problem of acrylic fiber dusts by imparting antistatic properties and smoothness to the fiber by the fiber treating agent. Here, the liner contains the fiber treating agent in an amount of 0.1–5% by weight. If the amount is below this range, the liner may not show expected effects, while when the amount exceeds this range, its performances will not be improved. Thus, any amounts outside this range are not economical. Amounts of 0.1–3% by weight are more preferred.

In the first invention, it is necessary to apply a fiber treating agent having a surface tension of 35–57 dyne/cm to the liner of the jacket. The larger the surface tension, the more efficient is expected the effect in imparting antistatic properties to the liner of the jacket of the floppy disk. However, when the surface tension of the surface treating agent exceeds 57 dyne/cm, the smoothness of the liner is deteriorated. After all, a treating agent having a highest possible surface tension below 57 dyne/cm is preferred. If the surface tension of the surface treating agent is less than 35 dyne/cm, the intended antistatic properties and/or smoothness are not exhibited.

Separately, the recording layer of the magnetic disk is formed by using a polyester polyurethane binder. The polyurethane portion thereof suffers swell by being brought into contact with a surface treating agent having a surface tension of 51–70 dyne/cm.

The liner, which employs a fiber treating agent having such surface tensions, can solve the problem of dusts owing to its antistatic properties. However, the floppy disk actually incorporating a magnetic disk gives very degraded performances of basic recording because the recording layer of the magnetic disk suffers fatal damage by the agent. Such phenomenon markedly appears a few days after combining the liner with the magnetic disk.

However, the above-described swelling can be prevented by using at least one of a trifunctional or upward acid component and a trifunctional or upward alcohol component in the polyester portion of the polyester polyurethane binder to form a crosslinked structure. Thus it becomes possible to use a treating agent having a surface tension as high as 57 dyne/cm or less.

In other words, a magnetic disk that employs such a specific polyester polyurethane binder can be combined with a liner in which a surface treating agent having sufficiently high antistatic properties is used. Accordingly, floppy disks completely free from the dust problem can be produced.

It is particularly preferable to prepare the polyester portion of the polyester polyurethane having a crosslinked structure by combining a dicarboxylic acid as the acid component and bifunctional and trifunctional alcohols as the alcohol component from the viewpoint of workability.

The bifunctional alcohol may include ethylene glycol, 1,4-butanediol, 1,6-hexanediol and neopentyl glycol, while the polyfunctional alcohol including trifunctional and upward ones may embrace trimethylolpropane, glycerol and pentaerythritol.

On the other hand, among the bifunctional carboxylic acids are phthalic acid, isophthalic acid and adipic acid, and as the trifunctional and upward carboxylic acids may be mentioned trimellitic acid.

It is also possible to use a lactone such as $\epsilon$-caprolactone.

No particular limitation is placed on the isocyanate that forms the polyurethane portion which combines with the polyester portion prepared from these alcohols and acids, and illustrative examples of the isocyanate may include tolylene diisocyanate and methylylene diisocyanate.

Further, in order to improve the finish of the recording layer, it is possible to use nitrocellulose together with the polyester polyurethane.

Illustrative examples of the fiber treating agent for use in the first invention include polyoxyethylene sorbitan monooleate, ester-type nonionic surface active agents, modified silicone oils and polyoxyethylene sorbitan monolaurate, which have a surface tension of 35–57 dyne/cm.

In the first invention, a fiber treating agent having a surface tension in the aforementioned range and a penetration coefficient of 22–26 may particularly preferably be used.

Here, the penetration coefficient is a value measured in the following manner. Namely, it is a value obtained by causing a glass capillary tube having an inner diameter of 250 μm to stand erect with its one end immersed in a liquid, sucking the liquid upto a liquid column height of 100 mm, opening the top of the capillary tube, leaving the capillary tube as it is for an hour, and measuring the resulting liquid column height in terms of mm. The liquid column height is a height that satisfies an equilibrium condition between the surface tension of the liquid used and the weight of the liquid column. The time in which the equilibrium condition is attained is prolonged with the increase of the viscosity. Accordingly, the liquid column height after the above-mentioned relatively short period of time (one hour) is a value determined by the viscosity and the surface tension.

If the viscosity of the fiber treating agent is too low, transfer of the fiber treating agent to the magnetic disk becomes unpreferably notable. The most suitable fiber treating agent to be applied to the liner, i.e. a fiber treating agent having a well ballanced surface tension and viscosity, is a fiber treating agent having a penetration coefficient of 22–26.

In the first invention, no particular limitation is imposed on the method of applying the fiber treating agent to the liner containing an acrylic fiber. However, a method can be mentioned which comprises forming a fiber comprising an acrylic fiber into a web, subjecting the web partially to thermocompression bonding to form a nonwoven fabric, and applying a fiber treating agent to the nonwoven fabric by mist spraying or foam coating.

When a fiber treating agent is applied by the mist spraying or foam coating, it is distributed more on the side of the fabric where the agent is applied. When the side to which the fiber treating agent is applied is used as the side of the liner to be brought into contact with a magnetic disk, rotation of the magnetic disk is sometimes impeded, even if the amount of the agent applied to the whole liner is less than 5% by weight. In this case, the problem can be solved easily by using the liner with its sides inverted.

In the floppy disk of the first invention thus prepared, the dusts generated upon producing the disk are small in number and removed easily, so that the floppy disk can secure a high yield and also is excellent in wipability. Since the liner of the jacket employs an acrylic fiber as the base fiber, its workability including punchability is excellent. Further, the floppy disk thus obtained has a high, long-term reliability.

Next, the second invention is illustrated.

Also, with the floppy disk of the second invention, the liner of the jacket is required to contain an acrylic fiber as the constituent fiber for the same reason as in the first invention. The properties and proportion of the acrylic fiber used and the fibers other than the acrylic fiber are the same as with the first invention.

The second invention also solves the problem of acrylic fiber dusts by imparting antistatic properties and smoothness to the fiber by the fiber treating agent. Here, the liner contains the fiber treating agent in an amount of 0.1–5% by weight. If the amount is below this range, the liner may not give expected effects, while when the amount exceeds this range, its performances will not be improved. Thus, any amounts outside this range are not economical. Amounts of 0.1–3% by weight are more preferred.

In the second invention where the non-crosslinked magnetic disk is used, it is necessary to apply a fiber treating agent having a surface tension of 35–47 dyne/cm to the liner of the jacket. If the surface tension of the surface treating agent applied to the liner exceeds 47 dyne/cm, the non-crosslinked magnetic disk suffers swelling. With the liner applied with the treating agent having such surface tensions, the dust problem can be solved owing to its antistatic properties. However, the recording layer of the magnetic disk suffers fatal damage several days after the assembly into a floppy disk so that its basic recording performance is seriously degraded.

Therefore, considering antistatic performance, it is necessary to use a fiber treating agent having a surface tension of 35–47 dyne/cm, where the non-crosslinked magnetic disk is combined. Needless to say, no problem will arise even if the agent having the tension of 35–47 dyne/cm is used in combination with the non-crosslinked magnetic disk.

By pairing such a specific polyester polyurethane binder with a fiber treating agent, it becomes possible to use a liner in which a highly antistatic fiber treating agent is employed. Thus a floppy disk completely free from the dust problem can be prepared.

The bifunctional alcohol, that forms the linear polyester portion of the polyester polyurethane binder in the non-crosslinked magnetic disk may include ethylene glycol, 1,4-butanediol, 1,6-hexanediol and neopentyl glycol.

On the other hand, the bifunctional carboxylic acid that forms the linear polyester portion may include phthalic acid, isophthalic acid and adipic acid.

It is also possible to use a lactone such as ε-caprolactone jointly, as a matter of course.

No particular restriction is imposed on the isocyanate for combining the polyester portions prepared from these alcohols and acids, and illustrative examples of the isocyanate may include tolylene diisocyanate and diphenylmethane diisocyanate.

It is also possible to use nitrocellulose together with the polyester polyurethane to improve the finish of the recording layer.

In the selection of the fiber treating agent, it is the aforementioned penetration coefficient that can determine the most suitable conditions within the range of the foregoing proper conditions of surface tension.

Generally, the larger the surface tension and the higher the viscosity, the greater is the penetration coefficient. However, if the viscosity of the fiber treating agent is too low, the fiber treating agent transfers to the magnetic disk noticeably, whereas if it is excessively high, the smoothness of the liner is deteriorated. The penetration coefficient is a value effective in considering the balance between the surface tension and the viscosity. A fiber treating agent with well-balanced surface tension and viscosity can be selected by the penetration coefficient. Fiber treating agents having a penetration coefficient of 16–20 are preferred for the non-crosslinked magnetic disk.

Among the fiber treating agents having the above-described properties are only a few agents that may possibly cause the polyurethane portion of the polyester polyurethane binder to swell or dissolve depending on their chemical composition. To prevent this phenomenon entirely, it is effective to use the fiber treating agent of which at least one of the solubility parameter and the HLB value is in the ranges described below.

The solubility parameter in the present invention is a value calculated according to the following equation described in Polymer Handbook (3rd edition) vol. 7, p 519 edited by J. Brandrup & E. H. Immergut (John Wiley & Sons, Inc.) from the chemical structure of a fiber treating agent:

$$\delta_i = A^{1/2}(1/V_i)^{1/6}\gamma_L^{1/2}$$

wherein $\epsilon_i$ is a solubility parameter, $v_i$ is a molar volume, $\epsilon_L$ is a surface tension, and A is a constant. A is calculated to be 19.9 (cal/cm$^3$ cm$^{1/2}$ dyne/cm) from the respective values of water: $\delta_i$=23.4 (cal/cm$^3$)$^{1/2}$, $\gamma_L$=72 (dyne/cm), and $V_i$=18 cm$^3$/mol (see the above Polymer Handbook (3rd edition).

In the present invention, where a fiber treating agent is used by dissolving it in water, its molar volume is calculated using the average molecular weight defined as follows:

average molecular weight=100/[(concentration of fiber treating agent(% by weight)/molecular weight of fiber treating agent)+(100−concentration of fiber treating agent(% by weight)/molecular weight of water]

In the second invention, the solubility parameter of the fiber treating agent is preferably 13 (cal/cm$^3$)$^{1/2}$ or more to attain the above-mentioned object. If the solubility parameter is less than 13 (cal/cm$^3$)$^{1/2}$, the fiber treating agent may possibly cause the polyurethane portion in the binder of the magnetic disk to swell or dissolve, resulting in recording error.

Next, the HLB value is illustrated. The HLB value is the so-called hydrophilic-lipophilic balance commonly used to date to measure the characteristics of a surface active agent. The HLB value used in the present invention is a value calculated on the basis of the numerical values described in Takeo Karime "Kaimen Kasseizai no Seishitsu to Ohyo (Nature and Application of Surface Active Agent)" first edition, p 56 (published by Saiwai Shobo K. K. ). In the present invention, the HLB value of the fiber treating agent is preferably 25 or more to attain the above-described object. If the HLB value of the fiber treating agent is less than 25, the agent may possibly cause the polyurethane in the recording layer of the magnetic disk to swell or dissolve, resulting in recording error.

For the above reason, cationic surface active agents represented by sodium paraffinsulfonate, sorbitan fatty acid esters, polyoxyethylene sorbitan monooleate and modified silicone oils, which are all in the range of the conditions described above, may be illustrated as the fiber treating agent of the second invention.

The same method as illustrated in the first invention may be applied to the application of the fiber treating agent to the liner containing an acrylic fiber.

In the floppy disk of the present invention thus prepared, the dusts generated upon its preparation are small in number and removed easily, so that the floppy disk can secure a high yield and also is excellent in wipability. Further, since the liner of the jacket employs an acrylic fiber as the base fiber, its workability including punchability is excellent. Further, the floppy disk of the present invention is superb in durability and has a high, long-term reliability in recording.

The present invention will be described in detail by the following examples.

Evaluations in the examples are made in the following manner.

Yield test

Magnetic disks were incorporated in 3.5 inch jackets provided with liners to assemble each 1,000 pieces of floppy disks. Measurements of regenerative output were made immediately after the assembly (yield test). Products that gave 70% or more of regenerative output were acceptable, and their number (%) was determined. The acceptable products were left alone at room temperature for ten days and subjected to the yield test again (yield test after ten-day leaving). Here, products that gave 70% or more of regenerative output were acceptable. The measuring apparatus used was FD-Certifier-CQ-35 made by Expert Magnetics Co., Ltd., and measurements were repeated 3 times.

Accelerated test

One thousand pieces of floppy disks prepared in the same manner as in the yield test were left to stand at 60° C. and 80% RH for there days and subjected to the yield test after moisture conditioning. Products that gave 70% or more of regenerated output were acceptable, and their number (%) was determined.

Durability test

Provided were each ten pieces of jackets in which floppy disks giving 70% or more of regenerative output were incorporated. They were rotated ten million pass. The regenerative output after the rotation was measured. Products that gave 70% or more of regenerative output were acceptable, and their number was determined.

Dust generation test

A specimen of each liner was cut with a hand cutter and the 1000 mm width of cut surface was immersed in water and submitted to ultrasonic vibration. The number of dusts having a size of 2 $\mu$m or above formed in water was measured by a particle counter.

Dust removal test

Each magnetic disk was incorporated in a 3.5-in jacket provided with a liner to prepare a floppy disk, which was submitted to ultrasonic vibration. Then, its window part was observed by means of a microscope to count the number of dusts of 1 $\mu$m or more. Compressed air of 0.5 kg/cm$^2$ was blown against the window part for three seconds. The window part was observed again with the microscope to count the number of dusts of 1 $\mu$m or more. The numbers before and after the blowing were compared to determine the dust residual rate. Floppy disks with a dust residual rate less than 90% are assumed to be excellent in dust removing properties.

Shape stability test

A specimen of each liner was left to stand at 60° C. and 80% RH for three hours and then its cloth shape was judged visually. ⊚: very good, ○: good, Δ: a little bad, X: bad Cutting ability test A specimen of each nonwoven fabric was punched in a liner shape and its cut part was observed visually. ⊚: very good, ○: good, Δ: a little bad, X : bad The fiber treating agents used in the following examples are shown in Table 1, and the composition of the polyester polyurethane binders used in the magnetic disks is given in Table 2.

Examples of the first invention is illustrated below.

EXAMPLES 1–10, COMPARATIVE EXAMPLES 1–4

A multilayer parallel web (from the surface layer, one layer of 100% rayon fiber web, five layers of 100% acrylic fiber web, and one layer of 100% rayon fiber web) with a weight of 35 g/m$^2$ (seven sheets of 5 g/m$^2$ unit) was formed from a rayon fiber (fineness 1.5 d, fiber length 51 mm) and an acrylic fiber (polymer composition; 93.1% by weight of acrylonitrile and 6.9% by weight of vinyl acetate: fineness 1.5 d, fiber length 51 mm) by coupling seven units of carding machines. The web was compression-bonded by an embossing roller having a surface temperature of 240° C. to prepare a nonweven fabric No. 1 for liner with its surfaces rugged.

Each of the fiber treating agents Nos. 1–6 given in Table 1 was applied to the nonwoven fabric by spray coating in an amount of 0.5% by weight to prepare a liner. Each floppy disk was prepared by attaching the liner to a jacket made from an ABS resin, with its spray-coated side coming into contact with the jacket, and combining the resultant jacket with each magnetic disk given in Table 2. The evaluation results are given in Table 3.

EXAMPLES 11–18, COMPARATIVE EXAMPLES 5–8

Floppy disks are prepared in the same manner as in Example 1 except that each of the fiber treating agents was applied to the nonwoven fabric by spray coating in an amount of 0.6% by weight. The evaluation results are given in Table 4.

EXAMPLES 19 AND 20, COMPARATIVE EXAMPLES 9 AND 10

Each floppy disk was prepared in the same manner as in Example 3 except that the fiber treating agent No. 3 was applied by spray coating in a respective amount of 0.05, 0.3, 1.0 or 6.0% by weight. The evaluation results are given in Table 5.

Then, examples of the second invention is described below.

EXAMPLES 21–24, COMPARATIVE EXAMPLES 11–13

Each fiber treating agent was applied by spray coating in an amount of 0.5% by weight to a similar nonwoven fabric No. 2 for liner to that used in Example 1 except that its weight was 32.2 g/m$^2$ (seven sheets of 4.6 g/m$^2$ unit). The liner was attached to the jacket so that its spray-coated side came into contact with the jacket, thereby preparing each floppy disk. The evaluation results are given in Table 6.

TABLE 1

| Fiber treating agent | Product name | Producer | Surface tension dyne/cm | Penetration coefficient | Solubility parameter (cal/cm$^3$)$^{1/2}$ | HLB Value |
| --- | --- | --- | --- | --- | --- | --- |
| 1 | F-col 214 | Matsumoto Oil & Fats Co. | 42 | 19 | 16.6 | 31.6 |
| 2 | MTB 638 | Takemoto Oil & Fats Co. | 44 | 20 | — | — |
| 3 | Silcan T80 | Matsumoto Oil & Fats Co. | 51 | 23 | 9.6 | 13.3 |
| 4 | Soft Oil J700 | Miyoshi Oil & Fat. Co. | 51 | 23 | — | — |
| 5 | Silicon Sofner 302 | Matsumoto Oil & Fats Co. | 54 | 25 | — | — |
| 6 | Leodol TWL 106 | Kao Corp. | 57 | 26 | 11.6 | 13.3 |

TABLE 2

| | | Magnetic disk | | |
| --- | --- | --- | --- | --- |
| | | A | A' | B |
| Composition of polyester polyurethane binder | Diisocyanate Polyester composition | Tolylene diisocyanate | Tolylene diisocyanate | Tolylene diisocyanate |
| | Alcohol | Ethylene glycol Trimethylolpropane Neopentyl glycol 1,6-hexanediol | Ethylene glycol Trimethylolpropane 1,4-butanediol | Ethylene glycol Neopentyl glycol |
| | Acid | Terephthalic acid Adipic acid Isophthalic acid | Terephthalic acid Adipic acid | Terephthalic acid Adipic acid Phthalic acid |
| | Lactone | | | ε-caprolactone |

TABLE 3

| | Example 1 | Example 2 | Example 3 | Example 4 | Comp. Ex. 1 | Example 5 | Example 6 |
| --- | --- | --- | --- | --- | --- | --- | --- |
| Liner | 1 | 1 | 1 | 1 | 1 | 1 | 1 |
| Fiber treating agent | 1 | 2 | 3 | 3 | 3 | 4 | 4 |
| Its amount applied (wt. %) | 0.5 | 0.5 | 0.5 | 0.5 | 0.5 | 0.5 | 0.5 |
| Disk | A' | A' | A | A' | B | A | A' |
| Yield (ratio of acceptable) | | | | | | | |
| Directly after assembly | 96.3 | 91.6 | 90.2 | 96.1 | 95.5 | 92.7 | 91.6 |
| 10 days after assembly | 95.4 | 92.7 | 89.6 | 94.2 | 66.9 | 92.0 | 94.1 |
| Accelerated test | 93.5 | 90.8 | 82.3 | 82.8 | 43.4 | 85.3 | 86.1 |
| Durability (number of acceptable) | 10/10 | 10/10 | 10/10 | 10/10 | 9/10 | 9/10 | 8/10 |
| Dust generating properties (number of dusts) | 423 | 387 | 471 | — | — | 555 | — |

TABLE 3-continued

| | | | | | | | |
|---|---|---|---|---|---|---|---|
| Dust removing properties (dust residual rate %) | 64.7 | 73.0 | 63.7 | 68.8 | 63.4 | 81.6 | 86.5 |
| Shape stability | ◎~○ | ◎~○ | ○ | ○ | ○ | ○ | ○ |
| Cutting ability | ◎~○ | ◎~○ | ◎~○ | ◎~○ | ◎~○ | ◎~○ | ◎~○ |

| | Comp. Ex. 2 | Example 7 | Example 8 | Comp. Ex. 3 | Example 9 | Example 10 | Comp. Ex. 4 |
|---|---|---|---|---|---|---|---|
| Liner | 1 | 1 | 1 | 1 | 1 | 1 | 1 |
| Fiber treating agent | 4 | 5 | 5 | 5 | 6 | 6 | 6 |
| Its amount applied (wt. %) | 0.5 | 0.5 | 0.5 | 0.5 | 0.5 | 0.5 | 0.5 |
| Disk | B | A | A' | B | A | A' | B |
| Yield (ratio of acceptable) | | | | | | | |
| Directly after assembly | 92.4 | 90.8 | 92.5 | 91.3 | 94.2 | 94.0 | 91.9 |
| 10 days after assembly | 81.8 | 91.1 | 91.9 | 77.2 | 93.9 | 92.8 | 73.5 |
| Accelerated test | 78.9 | 83.5 | 84.1 | 68.5 | 87.6 | 78.8 | 52.4 |
| Durability (number of acceptable) | 9/10 | 8/10 | 9/10 | 9/10 | 10/10 | 9/10 | 9/10 |
| Dust generating properties (number of dusts) | — | 413 | — | — | 535 | — | — |
| Dust removing properties (dust residual rate %) | 82.7 | 63.2 | 69.6 | 71.6 | 85.7 | 85.6 | 85.9 |
| Shape stability | ○ | ○ | ○ | ○ | ○ | ○ | ○ |
| Cutting ability | ◎~○ | ◎ | ◎ | ◎ | ◎~○ | ◎~○ | ◎~○ |

TABLE 4

| | Example 11 | Example 12 | Comp. Ex. 5 | Example 13 | Example 14 | Comp. Ex. 6 |
|---|---|---|---|---|---|---|
| Liner | 1 | 1 | 1 | 1 | 1 | 1 |
| Fiber treating agent | 3 | 3 | 3 | 4 | 4 | 4 |
| Its amount applied (wt. %) | 0.6 | 0.6 | 0.6 | 0.6 | 0.6 | 0.6 |
| Disk | A | A' | B | A | A' | B |
| Yield (ratio of acceptable) | | | | | | |
| Directly after assembly | 90.2 | 97.1 | 96.5 | 92.7 | 92.5 | 91.5 |
| 10 days after assembly | 89.6 | 95.1 | 67.6 | 92.0 | 93.2 | 82.6 |
| Accelerated test | 80.3 | 80.8 | 43.4 | 85.3 | 87.0 | 79.7 |
| Durability (number of acceptable) | 10/10 | 10/10 | 9/10 | 9/10 | 8/10 | 9/10 |
| Dust generating properties (number of dusts) | 466 | 498 | 544 | 555 | 570 | 490 |
| Dust removing properties (dust residual rate %) | 63.6 | 68.1 | 62.8 | 81.6 | 85.6 | 81.9 |
| Shape stability | ○ | ○ | ○ | ○ | ○ | ○ |
| Cutting ability | ◎ | ◎ | ◎ | ◎ | ◎ | ◎ |

| | Example 15 | Example 16 | Comp. Ex. 7 | Example 17 | Example 18 | Comp. Ex. 8 |
|---|---|---|---|---|---|---|
| Liner | 1 | 1 | 1 | 1 | 1 | 1 |
| Fiber treating agent | 5 | 5 | 5 | 6 | 6 | 6 |
| Its amount applied (wt. %) | 0.6 | 0.6 | 0.6 | 0.6 | 0.6 | 0.6 |
| Disk | A | A' | B | A | A' | B |
| Yield (ratio of acceptable) | | | | | | |
| Directly after assembly | 90.8 | 93.4 | 92.2 | 94.2 | 94.9 | 92.8 |
| 10 days after assembly | 91.1 | 92.8 | 78.4 | 93.9 | 93.7 | 74.2 |
| Accelerated test | 83.5 | 84.1 | 69.2 | 87.6 | 79.6 | 52.9 |
| Durability (number of acceptable) | 8/10 | 9/10 | 9/10 | 10/10 | 9/10 | 9/10 |
| Dust generating properties (number of dusts) | 409 | 480 | 455 | 535 | 553 | 543 |
| Dust removing properties (dust residual rate %) | 62.6 | 68.2 | 70.9 | 85.7 | 86.5 | 85.0 |
| Shape stability | ○ | ○ | ○ | ○ | ○ | ○ |
| Cutting ability | ◎ | ◎ | ◎ | ◎ | ◎ | ◎ |

TABLE 5

|  | Example 19 | Example 20 | Comp. Ex. 9 | Comp. Ex. 10 |
|---|---|---|---|---|
| Liner | 1 | 1 | 1 | 1 |
| Fiber treating agent | 3 | 3 | 3 | 3 |
| Its amount applied (wt. %) | 0.3 | 1.0 | 0.05 | 6.0 |
| Disk | A' | A' | A' | A' |
| Yield (ratio of acceptable) | | | | |
| Directly after assembly | 95.2 | 94.6 | 87.9 | 89.0 |
| 10 days after assembly | 93.4 | 94.7 | 87.5 | 84.8 |
| Accelerated test | 83.8 | 77.6 | 80.9 | 17.8 |
| Durability (number of acceptable) | 10/10 | 10/10 | 9/10 | 5/10 |
| Dust generating properties (number of dusts) | 423 | 455 | 452 | 517 |
| Dust removing properties (dust residual rate %) | 71.0 | 67.4 | 91.6 | 94.4 |
| Shape stability | ○ | ○ | ○ | ○~△ |
| Cutting ability | ◎ | ◎ | ◎ | △ |

TABLE 6

|  | Example 21 | Example 22 | Comp. Ex. 11 | Example 23 | Example 24 | Comp. Ex. 12 | Comp. Ex. 13 |
|---|---|---|---|---|---|---|---|
| Liner | 1 | 1 | 1 | 2 | 2 | 2 | 1 |
| Fiber treating agent | 1 | 2 | 3 | 1 | 2 | 3 | 6 |
| Its amount applied (wt. %) | 0.5 | 0.5 | 0.5 | 0.4 | 0.4 | 0.4 | 0.5 |
| Disk | B | B | B | B | B | B | B |
| Yield (ratio of acceptable) | | | | | | | |
| Directly after assembly | 94.5 | 92.2 | 96.5 | 91.7 | 89.5 | 93.7 | 92.8 |
| 10 days after assembly | 93.2 | 93.0 | 67.6 | 90.5 | 90.3 | 65.6 | 74.2 |
| Accelerated test | 91.3 | 91.1 | 43.4 | 88.6 | 88.4 | 42.1 | 52.9 |
| Durability (number of acceptable) | 10/10 | 9/10 | 9/10 | 10/10 | 9/10 | 9/10 | 9/10 |
| Dust generating properties (number of dusts) | 423 | 387 | 466 | 431 | 395 | 475 | 543 |
| Dust removing properties (dust residual rate %) | 65.3 | 72.9 | 62.8 | 67.3 | 75.1 | 64.7 | 85.0 |
| Shape stability | ○ | ○ | ○ | ○ | ○ | ○ | ○ |
| Cutting ability | ◎ | ◎ | ◎ | ◎ | ◎ | ◎ | ◎ |

What is claimed is:

1. A floppy disk comprising a jacket and a magnetic disk incorporated therein, the binder for fixing a magnetic substance in the recording layer of the magnetic disk being a polyester polyurethane, the polyester portion thereof being composed of at least one of a trifunctional acid component and a trifunctional alcohol component, and the liner of the jacket containing an acrylic fiber, wherein the liner of the jacket contains 0.1–5% by weight of a fiber treating agent having a surface tension of 51–55 dyne/cm.

2. The floppy disk according to claim 1 wherein the acid component of the polyester portion is a dicarboxylic acid and the alcohol component thereof is a bifunctional alcohol and a trifunctional alcohol.

3. The floppy disk according to claim 1 or 2 wherein the content of the acrylic fiber in the liner is 50–90% by weight.

4. The floppy disk according to claim 2, wherein said bifunctional alcohol is selected from the group consisting of ethylene glycol, 1,4-butanediol, 1,6-hexanediol, and neopentylglycol; said trifunctional alcohol is selected from the group consisting of trimethylolpropane and glycerol; and said dicarboxylic acid is selected from the group consisting of phthalic acid, isophthalic acid, and adipic acid.

5. The floppy disk according to claim 1, wherein said liner of said jacket comprises 0.1 to 3% by weight of said fiber treating agent.

* * * * *